US012449740B2

(12) United States Patent
Nishi et al.

(10) Patent No.: US 12,449,740 B2
(45) Date of Patent: Oct. 21, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Masashi Nishi, Kanagawa (JP); Kunihiko Sekido, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 568 days.

(21) Appl. No.: 17/823,627

(22) Filed: Aug. 31, 2022

(65) Prior Publication Data

US 2023/0093328 A1 Mar. 23, 2023

(30) Foreign Application Priority Data

Sep. 15, 2021 (JP) ................................ 2021-150504

(51) Int. Cl.
*G03G 5/047* (2006.01)
*G03G 5/06* (2006.01)
(Continued)

(52) U.S. Cl.
CPC ......... *G03G 5/047* (2013.01); *G03G 5/06142* (2020.05); *G03G 5/087* (2013.01); *G03G 5/09* (2013.01); *G03G 21/1814* (2013.01)

(58) Field of Classification Search
CPC .... G03G 5/047; G03G 5/06142; G03G 5/087; G03G 5/09; G03G 21/1814
See application file for complete search history.

(56) References Cited

U.S. PATENT DOCUMENTS 4,595,602 A 6/1986 Schank
5,604,061 A 2/1997 Sekido
(Continued)

FOREIGN PATENT DOCUMENTS

JP 61-072257 A 4/1986
JP 63-155146 A 6/1988
(Continued)

OTHER PUBLICATIONS

English machine translation of the description of JP-2019012124-A (Year: 2019).*

(Continued)

*Primary Examiner* — Mark F. Huff
*Assistant Examiner* — Boone Alexander Evans
(74) *Attorney, Agent, or Firm* — VENABLE LLP

(57) ABSTRACT

An electrophotographic photosensitive member includes a support, a photosensitive layer, and a surface layer. The surface layer includes a cured product of a composition containing an organic salt having a polymerizable functional group, and at least one of a charge-transportable compound or electroconductive particles. The organic salt is formed of an organic cation and at least one of $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$ or $I^-$.

13 Claims, 2 Drawing Sheets

(51) Int. Cl.

| | |
|---|---|
| ***G03G 5/087*** | (2006.01) |
| ***G03G 5/09*** | (2006.01) |
| ***G03G 21/18*** | (2006.01) |

(56) References Cited

U.S. PATENT DOCUMENTS

| | | | | |
|---|---|---|---|---|
| 6,228,546 | B1 | | 5/2001 | Kashizaki |
| 7,141,341 | B2 | | 11/2006 | Sekido |
| 8,343,699 | B2 | | 1/2013 | Nagasaka |
| 8,465,889 | B2 | | 6/2013 | Sekido |
| 8,524,430 | B2 | | 9/2013 | Takagi |
| 8,546,050 | B2 | | 10/2013 | Maruyama |
| 8,632,931 | B2 | | 1/2014 | Sekido |
| 8,795,936 | B2 | | 8/2014 | Sekido |
| 8,802,338 | B2 | | 8/2014 | Nukada et al. |
| 9,029,054 | B2 | | 5/2015 | Okuda |
| 9,063,505 | B2 | | 6/2015 | Sekiya |
| 9,069,267 | B2 | | 6/2015 | Kaku |
| 9,164,406 | B2 | | 10/2015 | Nishi |
| 9,207,550 | B2 | | 12/2015 | Okuda |
| 9,280,072 | B2 | | 3/2016 | Ogaki |
| 9,335,645 | B2 | | 5/2016 | Tagami |
| 9,442,401 | B2 | | 9/2016 | Sekido |
| 9,477,163 | B2 | | 10/2016 | Nishi |
| 9,760,030 | B2 | | 9/2017 | Sekiya |
| 9,772,568 | B2 | | 9/2017 | Sekido |
| 9,811,011 | B2 | | 11/2017 | Nishi |
| 9,851,648 | B2 | | 12/2017 | Nishi |
| 9,864,285 | B2 | | 1/2018 | Nishi |
| 9,921,498 | B2 | | 3/2018 | Sekido |
| 10,372,050 | B2 | | 8/2019 | Nishi |
| 10,969,703 | B2 | | 4/2021 | Takeuchi et al. |
| 2009/0092910 | A1 | | 4/2009 | Wu |
| 2009/0092911 | A1 | | 4/2009 | Wu et al. |
| 2009/0092912 | A1 | * | 4/2009 | Wu .................. G03G 5/061443 430/58.35 |
| 2009/0092915 | A1 | | 4/2009 | Wu et al. |
| 2015/0185628 | A1 | | 7/2015 | Black |
| 2019/0265602 | A1 | * | 8/2019 | Nakamura ........... G03G 5/0609 |
| 2021/0318628 | A1 | | 10/2021 | Sekido |
| 2021/0318629 | A1 | | 10/2021 | Nishi |

FOREIGN PATENT DOCUMENTS

| | | | | |
|---|---|---|---|---|
| JP | 1-124861 | A | | 5/1989 |
| JP | 5-150470 | A | | 6/1993 |
| JP | 5-181297 | A | | 7/1993 |
| JP | 6-83078 | A | | 3/1994 |
| JP | 6-161131 | A | | 6/1994 |
| JP | 6-161138 | A | | 6/1994 |
| JP | 6-308756 | A | | 11/1994 |
| JP | 2009229495 | A | * | 10/2009 |
| JP | 2010-230970 | A | | 10/2010 |
| JP | 2011-138030 | A | | 7/2011 |
| JP | 2016-90621 | A | | 5/2016 |
| JP | 2017-97005 | A | | 6/2017 |
| JP | 2019012124 | A | * | 1/2019 |
| JP | 2020-112621 | A | | 7/2020 |
| JP | 2023-43150 | A | | 3/2023 |

OTHER PUBLICATIONS

English machine translation of the description of JP-2009229495-A (Year: 2009).*

U.S. Appl. No. 17/930,206, Kunihiko Sekido, filed Sep. 7, 2022.

U.S. Appl. No. 17/936,088, Shuntaro Watanabe, filed Sep. 28, 2022.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, a process cartridge including the electrophotographic photosensitive member, and an electrophotographic apparatus including the electrophotographic photosensitive member.

Description of the Related Art

As an electrophotographic photosensitive member to be mounted onto an electrophotographic apparatus, there is widely used an electrophotographic photosensitive member containing an organic photoconductive substance. In recent years, an improvement in mechanical durability (abrasion resistance) of the electrophotographic photosensitive member has been required for the purposes of lengthening the lifetime of the electrophotographic photosensitive member and improving image quality at the time of its repeated use.

As a technology for improving the abrasion resistance of the electrophotographic photosensitive member, in Japanese Patent Application Laid-Open No. H06-308756, there is a description of a technology involving incorporating metal oxide into a surface layer of the electrophotographic photosensitive member.

In addition, in U.S. Patent Application Publication No. 2015/0185628, there is a description of a technology involving incorporating a polymerization product of a polyfunctional charge-transporting monomer into a surface layer.

However, each of the technologies disclosed in Japanese Patent Application Laid-Open No. H06-308756 and U.S. Patent Application Publication No. 2015/0185628 has sometimes failed to provide a sufficient suppressive effect on an increase in residual potential caused by a charge retained in the surface layer during a high-speed and long-duration electrophotographic process.

SUMMARY OF THE INVENTION

Accordingly, an object of the present invention is to provide an electrophotographic photosensitive member excellent in suppression of an increase in residual potential.

In addition, another object of the present invention is to provide a process cartridge including the electrophotographic photosensitive member, and an electrophotographic apparatus including the electrophotographic photosensitive member.

The above-mentioned objects are achieved by the following aspects of the present invention. According to one aspect of the present invention, there is provided an electrophotographic photosensitive member comprising: a support; and a surface layer, wherein the surface layer comprises a cured product of a composition containing: at least one selected from the group consisting of: a charge-transportable compound; and an electroconductive particle; and an organic salt having a polymerizable functional group, the organic salt being formed of: an organic cation; and at least one anion selected from the group consisting of: an organic anion; and an inorganic anion.

In addition, according to another aspect of the present invention, there is provided a process cartridge comprising: the electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus.

In addition, according to still another aspect of the present invention, there is provided an electrophotographic apparatus comprising: the electrophotographic photosensitive member; a charging unit; an exposing unit; a developing unit; and a transferring unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention relates to an electrophotographic photosensitive member including a support and a surface layer and having the following features. First, the surface layer includes a cured product of a composition containing: at least one selected from the group consisting of: a charge-transportable compound; and electroconductive particles; and an organic salt having a polymerizable functional group. In addition, the organic salt is an organic salt formed of: an organic cation; and at least one anion selected from the group consisting of: an organic anion; and an inorganic anion.

The inventors presume as described below as to the reason why the electrophotographic photosensitive member according to the present invention is excellent in suppression of an increase in residual potential.

The inventors conceive that the retention of a minute charge in the surface layer is one of the causes of an increase in residual potential. It is presumed that, during a high-speed and long-duration image-forming process, the surface layer is deteriorated through excessive friction or energization, and hence it becomes difficult for a charge to flow in the surface layer. It is conceived that, in such case, a minute charge is trapped and retained in the surface layer to become a residual charge, and the accumulation of the residual charge serves as a cause of an increase in residual potential. The organic salt to be used in the present invention, which is formed of an organic cation and at least one anion selected from the group consisting of: an organic anion; and an inorganic anion, plays a role in assisting the migration of a charge in the surface layer. The inventors conceive that, consequently, the retention of a charge can be suppressed, and an increase in residual potential can be suppressed.

The configuration of the electrophotographic photosensitive member according to the present invention is described below.

Figure 1:
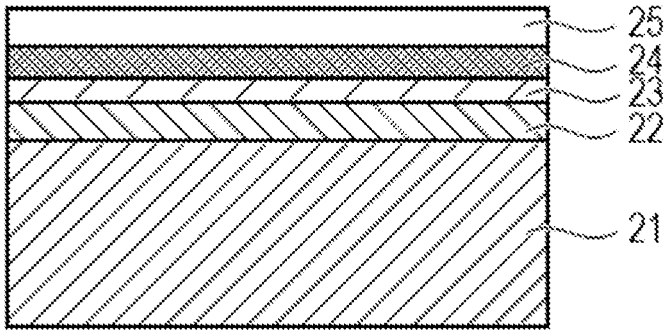
FIG. 1 is a schematic view for illustrating an example of the configuration of an electrophotographic photosensitive member according to the present invention.

FIG. 1 is a view for illustrating an example of the configuration of the electrophotographic photosensitive member according to the present invention. The electrophotographic photosensitive member according to the present invention includes a support 21 and a surface layer 25. In the present invention, the electrophotographic photosensitive member preferably includes the support 21, a charge-generating layer 23, a charge-transporting layer 24, and the surface layer 25 in the stated order.

In the present invention, it is particularly preferred that the above-mentioned composition contain the charge-transportable compound, and that the electrophotographic photosensitive member include the support 21, the charge-generating layer 23, a first charge-transporting layer, and a second charge-transporting layer in the stated order. In this case, the first charge-transporting layer is the charge-transporting layer 24, and the second charge-transporting layer is the surface layer 25.

In the present invention, it is also particularly preferred that the composition contain the electroconductive particles, and that the electrophotographic photosensitive member include the support 21, the charge-generating layer 23, the charge-transporting layer 24, and the surface layer 25 in the stated order.

Further, the electrophotographic photosensitive member according to the present invention may include an undercoat layer 22 on the support 21 as illustrated in FIG. 1, and may also include an electroconductive layer (not shown) between the support 21 and the undercoat layer 22.

<Support>

In the present invention, the support is preferably an electroconductive support having conductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, conductivity is preferably imparted to the resin or the glass through treatment involving, for example, mixing or coating the resin or the glass with an electroconductive material.

<Electroconductive Layer>

In the electrophotographic photosensitive member according to the present invention, the electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, each of the electroconductive particles may be of a laminated construction having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer may be formed by preparing a coating liquid for an electroconductive layer containing the above-mentioned materials and a solvent, forming a coat thereof on the support, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision-type high-speed disperser.

The electroconductive layer has a thickness of preferably 1 to 40 μm, particularly preferably 3 to 30 μm.

<Undercoat Layer>

In the present invention, the undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

The metal oxide particles to be incorporated into the undercoat layer may be subjected to surface treatment with a surface treatment agent such as a silane coupling agent before use.

A general method is used as a method of subjecting the metal oxide particles to the surface treatment. Examples thereof include a dry method and a wet method.

The dry method involves, while stirring the metal oxide particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the metal oxide particles and the surface treatment agent in a solvent, or dispersing the metal oxide particles and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The undercoat layer may further contain an additive, and for example, may contain a known material, such as: powder of a metal such as aluminum; an electroconductive substance such as carbon black; a charge-transporting substance; a metal chelate compound; or an organometallic compound.

Examples of the charge-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. A charge-transporting substance having a polymerizable functional group may be used as the charge-transporting substance and copolymerized with the above-mentioned monomer having a polymerizable functional group to form the undercoat layer as a cured film.

The undercoat layer may be formed by preparing a coating liquid for an undercoat layer containing the above-mentioned materials and a solvent, forming a coat thereof on the support or the electroconductive layer, and drying and/or curing the coat.

Examples of the solvent to be used for the coating liquid for an undercoat layer include organic solvents, such as an alcohol, a sulfoxide, a ketone, an ether, an ester, an aliphatic halogenated hydrocarbon, and an aromatic compound. In the present invention, alcohol-based and ketone-based solvents are preferably used.

A dispersion method for preparing the coating liquid for an undercoat layer is, for example, a method involving using a homogenizer, an ultrasonic disperser, a ball mill, a sand mill, a roll mill, a vibration mill, an attritor, or a liquid collision-type high-speed disperser.

The undercoat layer has a thickness of preferably 0.1 to 10 μm, more preferably 0.1 to 5 μm.

<Photosensitive Layer>

The photosensitive layers of the electrophotographic photosensitive member are mainly classified into (1) a laminate-type photosensitive layer and (2) a monolayer-type photosensitive layer. (1) The laminate-type photosensitive layer is a photosensitive layer having a charge-generating layer containing a charge-generating substance and a charge-transporting layer containing a charge-transporting substance. (2) The monolayer-type photosensitive layer is a photosensitive layer containing both a charge-generating substance and a charge-transporting substance.

(1) Laminate-Type Photosensitive Layer

The laminate-type photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 to 85 mass %, more preferably 60 to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer may be formed by preparing a coating liquid for a charge-generating layer containing the above-mentioned materials and a solvent, forming a coat thereof on the undercoat layer, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The charge-generating layer has a thickness of preferably 0.1 to 1 μm, more preferably 0.15 to 0.4 μm.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 to 70 mass %, more preferably 30 to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer may be formed by preparing a coating liquid for a charge-transporting layer containing the above-mentioned materials and a solvent, forming a coat thereof on the charge-generating layer, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The charge-transporting layer has a thickness of 3 to 50 μm, more preferably 5 to 40 μm, particularly preferably 10 to 30 μm.

(2) Monolayer-Type Photosensitive Layer

The monolayer-type photosensitive layer may be formed by preparing a coating liquid for a photosensitive layer containing the charge-generating substance, the charge-transporting substance, a resin, and a solvent, forming a coat thereof on the undercoat layer, and drying the coat. Examples of the charge-generating substance, the charge-transporting substance, and the resin are the same as those of the materials in the section "(1) Laminate-type Photosensitive Layer."

<Surface Layer>

The surface layer includes a cured product of a composition containing at least one selected from the group consisting of: a charge-transportable compound; and electroconductive particles, and an organic salt having a polymerizable functional group. In addition, the organic salt is formed of an organic cation and at least one anion selected from the group consisting of: an organic anion; and an inorganic anion.

A polycyclic aromatic compound, a heterocyclic compound, a hydrazone compound, a styryl compound, an enamine compound, a benzidine compound, a triarylamine compound, or the like may be used as the charge-transportable compound. Of those, a triarylamine compound is preferred.

It is preferred that the charge-transportable compound be a charge-transporting monomer having a polymerizable functional group capable of reacting with an organic salt. In addition, it is more preferred that the charge-transporting monomer be a compound represented by the following formula (1).

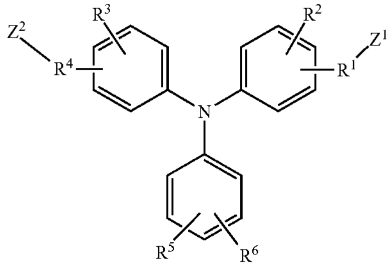

(1)

In the formula (1), $R^1$ and $R^4$ each independently represent a single bond, an unsubstituted alkylene group having 3 or less carbon atoms, or a phenylene group, $R^2$, $R^3$, $R^5$, and $R^6$ each independently represent a hydrogen atom, a methyl group, or an ethyl group, and $Z^1$ and $Z^2$ each independently represent a hydrogen atom, an acryloyloxy group, a methacryloyloxy group, a vinyl group, a hydroxy group, a carboxy group, a thiol group, or an amino group, provided that at least any one of $Z^1$ and $Z^2$ represents an acryloyloxy group, a methacryloyloxy group, a vinyl group, a hydroxy group, a carboxy group, a thiol group, or an amino group.

At least any one of $Z^1$ and $Z^2$ in the compound represented by the formula (1) preferably represents an acryloyloxy group, a methacryloyloxy group, or a vinyl group.

The content of the charge-transportable compound in the surface layer is preferably 30 to 99 mass %, more preferably 40 to 80 mass % with respect to the total mass of the surface layer.

Examples of the electroconductive particles include particles of a metal oxide, such as titanium oxide, zinc oxide, tin oxide, or indium oxide.

When the metal oxide is used as the electroconductive particles, the metal oxide may be doped with an element, such as niobium, phosphorus, or aluminum, or an oxide thereof.

In addition, the electroconductive particles may each be of a laminated construction having a core particle and a coating layer coating the particle. Examples of the core particle include titanium oxide, barium sulfate, and zinc oxide. An example of the coating layer is a metal oxide, such as titanium oxide or tin oxide. In addition, from the viewpoints of dispersibility and liquid stability, the surface of the metal oxide is preferably treated with a silane coupling agent or the like.

In particular, the electroconductive particles are preferably titanium oxide particles, and the titanium oxide particles are preferably niobium-containing titanium oxide particles.

The niobium-containing titanium oxide particles to be used may each have any of various shapes, such as a spherical shape, a polyhedral shape, an ellipsoidal shape, a flaky shape, and a needle shape. Of those, particles each having a spherical shape, a polyhedral shape, or an ellipsoidal shape are preferred from the viewpoint that image defects such as black spots are reduced. In the present invention, the niobium-containing titanium oxide particles each more preferably have a spherical shape or a polyhedral shape close to a spherical shape.

The niobium-containing titanium oxide particles are preferably anatase-type titanium oxide or rutile-type titanium oxide, more preferably anatase-type titanium oxide. When anatase-type titanium oxide is used, a property of injecting a charge into the surface layer becomes satisfactory. In the present invention, it is particularly preferred that the niobium-containing titanium oxide particles be particles each obtained by coating an anatase-type titanium oxide particle serving as a core with niobium-containing titanium oxide.

The content of niobium is preferably 0.5 to 15.0 mass %, more preferably 2.6 to 10.0 mass % with respect to the mass of the niobium-containing titanium oxide particles.

When the metal oxide is used as the electroconductive particles, their volume-average particle diameter is preferably 1 to 500 nm, more preferably 3 to 300 nm, still more preferably 5 to 100 nm.

Further, from the viewpoint of the strength of the surface layer, the volume ratio of the electroconductive particles in the surface layer is preferably 40 to 70 vol %, more preferably 45 to 65 vol %.

(Organic Salt Formed of Organic Cation and Anion)

An organic cation, such as an imidazolium, a pyridinium, a pyrrolidinium, a piperidinium, an alkyl ammonium, an alkyl phosphonium, or an alkyl sulfonium, may be used as the organic cation. Of those, at least one organic cation selected from the group consisting of: an imidazolium; a pyridinium; a pyrrolidinium; a piperidinium; a tetraalkyl ammonium; and a tetraalkyl phosphonium is preferred as the organic cation.

Any of an organic anion and an inorganic anion may be used as the anion. Both of those anions may be used in combination. An anion, such as a carboxylate, a phosphate, a halogenate, a sulfate, a sulfonate, a borate, a cyanate, a thiocyanate, or a sulfonylimide, may be used as the anion. Of those, $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$, or $I^-$ is preferred.

The organic salt is preferably at least one compound selected from the group consisting of: a compound represented by the following formula (A); a compound represented by the following formula (B); a compound represented by the following formula (C); a compound represented by the following formula (D); and a compound represented by the following formula (E).

(A)

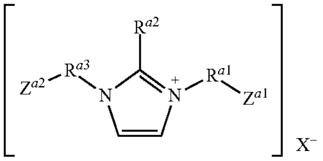

In the formula (A), $R^{a1}$ and $R^{a3}$ each independently represent a single bond, or an alkylene group having 8 or less carbon atoms that may have a hydroxy group as a substituent, $R^{a2}$ represents a hydrogen atom, a methyl group, or an ethyl group, $Z^{a1}$ and $Z^{a2}$ each independently represent a hydrogen atom, an acryloyloxy group, a methacryloyloxy group, a vinyl group, a hydroxy group, a carboxy group, a thiol group, or an amino group, provided that at least any one of $Z^{a1}$ and $Z^{a2}$ represents an acryloyloxy group, a methacryloyloxy group, a vinyl group, a hydroxy group, a carboxy group, a thiol group, or an amino group, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$, or $I^-$.

At least any one of $Z^{a1}$ and $Z^{a2}$ in the compound represented by the formula (A) preferably represents an acryloyloxy group, a methacryloyloxy group, or a vinyl group.

(B)

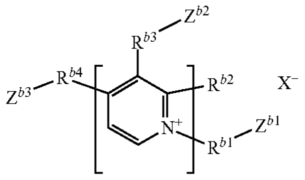

In the formula (B), $R^{b1}$, $R^{b3}$, and $R^{b4}$ each independently represent a single bond, or an alkylene group having 8 or less carbon atoms that may have a hydroxy group as a substituent, $R^{b2}$ represents a hydrogen atom, a methyl group, or an ethyl group, $Z^{b1}$, $Z^{b2}$, and $Z^{b3}$ each independently represent a hydrogen atom, an acryloyloxy group, a methacryloyloxy group, a vinyl group, a hydroxy group, a carboxy group, a thiol group, or an amino group, provided that at least any one of $Z^{b1}$, $Z^{b2}$, and $Z^{b3}$ represents an acryloyloxy group, a methacryloyloxy group, a vinyl group, a hydroxy group, a carboxy group, a thiol group, or an amino group, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$, or $I^-$.

At least any one of $Z^{b1}$, $Z^{b2}$, and $Z^{b3}$ in the compound represented by the formula (B) preferably represents an acryloyloxy group, a methacryloyloxy group, or a vinyl group.

(C)

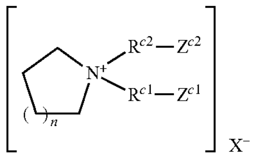

In the formula (C), $R^{c1}$ and $R^{c2}$ each independently represent a single bond, or an alkylene group having 8 or less carbon atoms that may have a hydroxy group as a substituent, $Z^{c1}$ and $Z^{c2}$ each independently represent a hydrogen atom, an acryloyloxy group, a methacryloyloxy group, a vinyl group, a hydroxy group, a carboxy group, a thiol group, or an amino group, provided that at least any one of $Z^{c1}$ and $Z^{c2}$ represents an acryloyloxy group, a methacryloyloxy group, a vinyl group, a hydroxy group, a carboxy group, a thiol group, or an amino group, "n" represents 1 or 2, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$, or $I^-$.

At least any one of $Z^{c1}$ and $Z^{c2}$ in the compound represented by the formula (C) preferably represents an acryloyloxy group, a methacryloyloxy group, or a vinyl group.

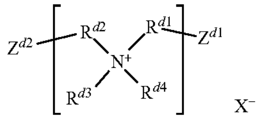

(D)

In the formula (D), $R^{d1}$ and $R^{d2}$ each independently represent a single bond, or an alkylene group having 8 or less carbon atoms that may have a hydroxy group as a substituent, $R^{d3}$ and $R^{d4}$ each independently represent an alkyl group having 8 or less carbon atoms that may have a hydroxy group as a substituent, $Z^{d1}$ and $Z^{d2}$ each independently represent a hydrogen atom, an acryloyloxy group, a methacryloyloxy group, a vinyl group, a hydroxy group, a carboxy group, a thiol group, or an amino group, provided that at least any one of $Z^{d1}$ and $Z^{d2}$ represents an acryloyloxy group, a methacryloyloxy group, a vinyl group, a hydroxy group, a carboxy group, a thiol group, or an amino group, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$, or $I^-$.

At least any one of $Z^{d1}$ and $Z^{d2}$ in the compound represented by the formula (D) preferably represents an acryloyloxy group, a methacryloyloxy group, or a vinyl group.

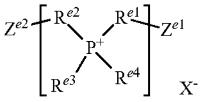

(E)

In the formula (E), $R^{e1}$ and $R^{e2}$ each independently represent a single bond, or an alkylene group having 8 or less carbon atoms that may have a hydroxy group as a substituent, $R^{e3}$ and $R^{e4}$ each independently represent an alkyl group having 8 or less carbon atoms that may have a hydroxy group as a substituent, $Z^{e1}$ and $Z^{e2}$ each independently represent a hydrogen atom, an acryloyloxy group, a methacryloyloxy group, a vinyl group, a hydroxy group, a carboxy group, a thiol group, or an amino group, provided that at least any one of $Z^{e1}$ and $Z^{e2}$ represents an acryloyloxy group, a methacryloyloxy group, a vinyl group, a hydroxy group, a carboxy group, a thiol group, or an amino group, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$, or $I^-$.

At least any one of $Z^{e1}$ and $Z^{e2}$ in the compound represented by the formula (E) preferably represents an acryloyloxy group, a methacryloyloxy group, or a vinyl group.

The content of the organic salt in the surface layer is preferably 0.005 to 35 mass %, more preferably 0.05 to 1 mass % with respect to the total mass of the surface layer.

Specific examples of the compound represented by the formula (A) are shown in Table 1, specific examples of the compound represented by the formula (B) are shown in Table 2, specific examples of the compound represented by the formula (C) are shown in Table 3, specific examples of the compound represented by the formula (D) are shown in Table 4, and specific examples of the compound represented by the formula (E) are shown in Table 5.

TABLE 1

| Compound | Cation | | | | | Anion |
|---|---|---|---|---|---|---|
| number | $R^{a1}$ | $R^{a2}$ | $R^{a3}$ | $Z^{a1}$ | $Z^{a2}$ | $X^-$ |
| A1 | —$CH_2$— | —H | —$CH_2$— | —CH═$CH_2$ | —H | $(CF_3SO_2)_2N^-$ |
| A2 | —$CH_2$— | —H | —$CH_2$— | —O—CO—CH═$CH_2$ | —O—CO—CH═$CH_2$ | $Cl^-$ |
| A3 | —$C_3H_6$— | —$CH_3$ | —$C_3H_6$— | —CH═$CH_2$ | —CH═$CH_2$ | $(CF_3SO_2)_2N^-$ |
| A4 | —$C_2H_4$— | —H | —$C_2H_4$— | —O—CO—CH═$CH_2$ | —O—CO—CH═$CH_2$ | $PF_6^-$ |
| A5 | —$C_2H_4$— | —H | —$C_4H_8$— | —O—CO—C($CH_3$)═$CH_2$ | —H | $Br^-$ |
| A6 | —$CH_2$—CH(OH)—$CH_2$— | —$C_2H_5$ | —$CH_2$— | —O—CO—CH═$CH_2$ | —H | $BF_4^-$ |
| A7 | —$C_2H_4$— | —H | —$C_2H_4$— | —OH | —OH | $(CF_3SO_2)_2N^-$ |
| A8 | —$C_2H_4$— | —H | —$C_2H_4$— | —OH | —H | $(CN)_2N^-$ |
| A9 | —$C_2H_4$— | —H | —$C_2H_4$— | —SH | —SH | $(CF_3SO_2)_2N^-$ |
| A10 | —$C_2H_4$— | —H | —$C_2H_4$— | —$NH_2$ | —$NH_2$ | $PF_6^-$ |

TABLE 2

| Compound | Cation | | | | |
|---|---|---|---|---|---|
| number | $R^{b1}$ | $R^{b2}$ | $R^{b3}$ | $R^{b4}$ | $Z^{b1}$ |
| B1 | —$C_2H_4$— | —H | — | —$CH_2$— | —O—CO—CH═$CH_2$ |
| B2 | —$C_2H_4$— | —H | —$C_2H_4$— | — | —CH═$CH_2$ |
| B3 | —$C_3H_5$— | —H | —$C_2H_4$— | — | —O—CO—CH═$CH_2$ |
| B4 | —$C_2H_4$— | —$CH_3$ | — | —$C_2H_4$— | —O—CO—C($CH_3$)═$CH_2$ |
| B5 | —$C_3H_6$— | —$C_2H_5$ | — | —$C_3H_6$— | —CH═$CH_2$ |
| B6 | —$CH_2$—CH(OH)—$CH_2$— | —H | — | —$CH_2$— | —O—CO—C($CH_3$)═$CH_2$ |
| B7 | —$C_3H_5$— | —H | —$CH_2$— | — | —OH |
| B8 | —$C_2H_4$— | —H | —$CH_2$— | — | —OH |
| B9 | —$C_2H_4$— | —H | — | —$C_2H_4$— | —COOH |
| B10 | —$C_2H_4$— | —H | — | —$C_2H_4$— | —SH |

TABLE 2-continued

| Compound | Cation | | Anion |
|---|---|---|---|
| number | $Z^{b2}$ | $Z^{b3}$ | $X^-$ |
| B1 | —H | —H | $PF_6^-$ |
| B2 | —H | —H | $(CF_3SO_2)_2N^-$ |
| B3 | —O—CO—CH═$CH_2$ | —H | $I^-$ |
| B4 | —H | —O—CO—C($CH_3$)═$CH_2$ | $BF_4^-$ |
| B5 | —H | —CH═$CH_2$ | $CH_3COO^-$ |
| B6 | —H | —H | $SCN^-$ |
| B7 | —H | —H | $Br^-$ |
| B8 | —OH | —H | $C_2H_5OSO_3^-$ |
| B9 | —H | —COOH | $(CF_3SO_2)_2N^-$ |
| B10 | —H | —SH | $(CN)_2N^-$ |

TABLE 3

| Compound | Cation | | | | | Anion |
|---|---|---|---|---|---|---|
| number | n | $R^{c1}$ | $R^{c2}$ | $Z^{c1}$ | $Z^{c2}$ | $X^-$ |
| C1 | 1 | —$CH_2$— | — | —CH═$CH_2$ | —H | $(CF_3SO_2)_2N^-$ |
| C2 | 1 | —$C_2H_4$— | —$C_2H_4$— | —CH═$CH_2$ | —CH═$CH_2$ | $(CN)_2N^-$ |
| C3 | 1 | —$C_2H_4$— | —$C_2H_4$— | —O—CO—CH═$CH_2$ | —O—CO—CH═$CH_2$ | $BF_4^-$ |
| C4 | 1 | —$CH_2$—CH(OH)—$CH_2$— | —$CH_2$— | —O—CO—C($CH_3$)═$CH_2$ | —H | $C_2H_5OSO_3^-$ |
| C5 | 1 | —$C_3H_6$— | —$C_3H_6$— | —O—CO—CH═$CH_2$ | —O—CO—CH═$CH_2$ | $Br^-$ |
| C6 | 2 | —$C_2H_4$— | —$C_2H_4$— | —OH | —OH | $(CF_3SO_2)_2N^-$ |
| C7 | 2 | —$C_2H_4$— | —$CH_2$— | —OH | —H | $I^-$ |
| C8 | 2 | —$C_3H_6$— | —$C_3H_6$— | —OH | —OH | $CF_3SO_3^-$ |
| C9 | 2 | —$C_2H_4$— | —$C_2H_4$— | —SH | —SH | $(FSO_2)N^-$ |
| C10 | 2 | —$C_2H_4$— | —$C_2H_4$— | —COOH | —COOH | $Cl^-$ |

TABLE 4

| Compound | Cation | | | |
|---|---|---|---|---|
| number | $R^{d1}$ | $R^{d2}$ | $R^{d3}$ | $R^{d4}$ |
| D1 | —$C_2H_4$— | —$C_4H_9$— | —$CH_3$ | —$CH_3$ |
| D2 | —$C_2H_4$— | —$C_2H_4$— | —$CH_3$ | —$CH_3$ |
| D3 | —$CH_2$—CH(OH)—$CH_2$— | —$CH_2$— | —$CH_3$ | —$CH_3$ |
| D4 | —$C_2H_4$— | —$C_2H_4$— | —$C_3H_7$ | —$C_3H_7$ |
| D5 | —$C_2H_4$— | —$C_2H_4$— | —$CH_3$ | —$CH_3$ |
| D6 | —$CH_2$—CH(OH)—$CH_2$— | —$CH_2$—CH(OH)—$CH_2$— | —$CH_3$ | —$CH_3$ |
| D7 | —$C_2H_4$— | —$CH_2$— | —$CH_3$ | —$CH_3$ |
| D8 | —$C_2H_4$— | —$C_2H_4$— | —$CH_3$ | —$CH_3$ |
| D9 | —$C_2H_4$— | —$C_2H_4$— | —$C_2H_5$ | —$C_2H_5$ |
| D10 | —$C_2H_4$— | —$C_2H_4$— | —$C_2H_5$ | —$C_2H_5$ |

| Compound | Cation | | Anion |
|---|---|---|---|
| number | $Z^{d1}$ | $Z^{d2}$ | $X^-$ |
| D1 | —O—CO—CH═$CH_2$ | —H | $(CF_3SO_2)_2N^-$ |
| D2 | —O—CO—CH═$CH_2$ | —O—CO—CH═$CH_2$ | $Br^-$ |
| D3 | —O—CO—C($CH_3$)═$CH_2$ | —H | $(CF_3SO_2)_2N^-$ |
| D4 | —O—CO—CH═$CH_2$ | —O—CO—CH═$CH_2$ | $(FSO_2)N^-$ |
| D5 | —CH═$CH_2$ | —CH═$CH_2$ | $BF_4^-$ |
| D6 | —O—CO—C($CH_3$)═$CH_2$ | —O—CO—C($CH_3$)═$CH_2$ | $(CN)_2N^-$ |
| D7 | —OH | —H | $CH_3COO^-$ |
| D8 | —OH | —OH | $C_2H_5OSO_3^-$ |
| D9 | —SH | —H | $I^-$ |
| D10 | —SH | —SH | $PF_6^-$ |

TABLE 5

| Compound | Cation | | | |
|---|---|---|---|---|
| number | $R^{e1}$ | $R^{e2}$ | $R^{e3}$ | $R^{e4}$ |
| E1 | $-C_2H_4-$ | $-C_4H_9-$ | $-C_2H_5$ | $-C_2H_5$ |
| E2 | $-C_3H_6-$ | $-C_3H_6-$ | $-CH_3$ | $-CH_3$ |
| E3 | $-CH_2-CH(OH)-CH_2-$ | $-C_2H_4-$ | $-CH_3$ | $-CH_3$ |
| E4 | $-C_2H_4-$ | $-C_2H_4-$ | $-CH_3$ | $-CH_3$ |
| E5 | $-C_3H_6-$ | $-C_3H_6-$ | $-CH_3$ | $-CH_3$ |
| E6 | $-CH_2-CH(OH)-CH_2-$ | $-CH_2-CH(OH)-CH_2-$ | $-CH_3$ | $-CH_3$ |
| E7 | $-C_2H_4-$ | $-CH_2-$ | $-CH_3$ | $-CH_3$ |
| E8 | $-C_2H_4-$ | $-C_2H_4-$ | $-CH_3$ | $-CH_3$ |
| E9 | $-C_2H_4-$ | $-C_2H_4-$ | $-CH_3$ | $-CH_3$ |
| E10 | $-C_2H_4-$ | $-C_2H_4-$ | $-CH_3$ | $-CH_3$ |

| Compound | Cation | | Anion |
|---|---|---|---|
| number | $Z^{e1}$ | $Z^{e2}$ | $X^-$ |
| E1 | $-O-CO-CH=CH_2$ | $-H$ | $PF_6^-$ |
| E2 | $-O-CO-CH=CH_2$ | $-O-CO-CH=CH_2$ | $(CF_3SO_2)_2N^-$ |
| E3 | $-O-CO-C(CH_3)=CH_2$ | $-H$ | $SCN^-$ |
| E4 | $-O-CO-CH=CH_2$ | $-O-CO-CH=CH_2$ | $I^-$ |
| E5 | $-CH=CH_2$ | $-CH=CH_2$ | $(CF_3SO_2)_2N^-$ |
| E6 | $-O-CO-CH=CH_2$ | $-O-CO-CH=CH_2$ | $(CN)_2N^-$ |
| E7 | $-OH$ | $-H$ | $PF_6^-$ |
| E8 | $-OH$ | $-OH$ | $CF_3SO_3^-$ |
| E9 | $-SH$ | $-H$ | $(CN)_2N^-$ |
| E10 | $-SH$ | $-SH$ | $C_2H_5OSO_3^-$ |

The content ratio of the charge-transportable compound with respect to the organic salt in the above-mentioned composition is preferably 10 to 1,000 mass %.

In addition, the content ratio of the electroconductive particles with respect to the organic salt in the composition is preferably 10 to 1,000 mass %.

The surface layer may further contain: a polymerization product of a compound having a polymerizable functional group; and a resin.

Examples of the polymerizable functional group include an acrylic group, a methacrylic group, a vinyl group, an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, a carbon-carbon double bond group, an alkoxysilyl group, and a silanol group. Of those, an acrylic group, a methacrylic group, and a vinyl group are preferred.

Examples of the resin include a polyester resin, an acrylic resin, a phenoxy resin, a polycarbonate resin, a polystyrene resin, a phenol resin, a melamine resin, and an epoxy resin. Of those, an acrylic resin is preferred.

The surface layer may contain an additive, such as an antioxidant, a UV absorber, a plasticizer, a leveling agent, a slipperiness-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The surface layer may be formed by preparing a coating liquid for a protective layer containing the above-mentioned materials and a solvent, forming a coat thereof on the photosensitive layer, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The surface layer has a thickness of preferably 0.2 to 5 μm, more preferably 0.5 to 3 μm.

[Process Cartridge and Electrophotographic Apparatus]

A process cartridge according to the present invention is characterized by integrally supporting the electrophotographic photosensitive member described in the foregoing, and at least one unit selected from the group consisting of: a charging unit; a developing unit; a transferring unit; and a cleaning unit, and being detachably attachable to the main body of an electrophotographic apparatus.

In addition, an electrophotographic apparatus according to the present invention is characterized by including: the electrophotographic photosensitive member described in the foregoing; a charging unit; an exposing unit; a developing unit; and a transferring unit.

Figure 2:
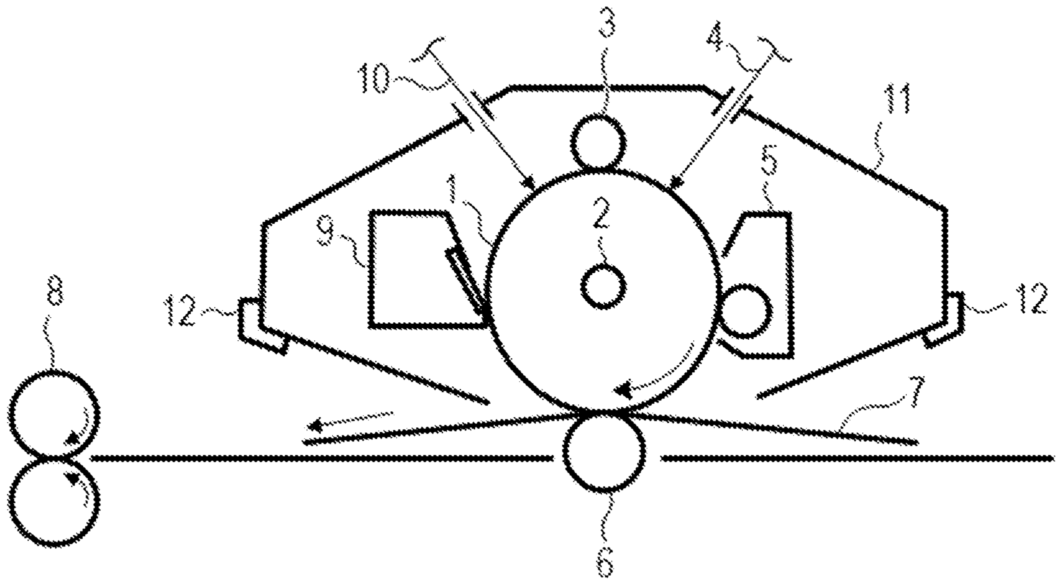
FIG. 2 is a view for illustrating an example of the schematic configuration of a process cartridge including the electrophotographic photosensitive member according to the present invention and an electrophotographic apparatus including the process cartridge.

An example of the schematic configuration of an electrophotographic apparatus including a process cartridge including an electrophotographic photosensitive member according to the present invention is illustrated in FIG. 2.

An electrophotographic photosensitive member 1 of a cylindrical shape (drum shape) is rotationally driven about a shaft 2 in a direction indicated by the arrow at a predetermined peripheral speed (process speed). The surface of the electrophotographic photosensitive member 1 is charged to a predetermined positive or negative potential by a charging unit 3 in the rotational process. In FIG. 2, a roller charging system based on a roller-type charging member is illustrated, but a charging system, such as a corona charging system, a proximity charging system, or an injection charging system, may be adopted.

The charged surface of the electrophotographic photosensitive member 1 is irradiated with exposure light 4 from an exposing unit (not shown), and hence an electrostatic latent image corresponding to target image information is formed thereon. The exposure light 4 is light whose intensity has been modulated in correspondence with a time-series electric digital image signal of information on a target image, and is emitted, for example, from an image exposing unit, such as slit exposure or laser beam scanning exposure.

The electrostatic latent image formed on the surface of the electrophotographic photosensitive member 1 is developed (normal development or reversal development) with toner stored in a developing unit 5 to form a toner image on the surface of the electrophotographic photosensitive member 1. The toner image formed on the surface of the electrophotographic photosensitive member 1 is transferred by a transferring unit 6 onto a transfer material 7. At this time, a bias voltage opposite in polarity to charge that the toner possesses is applied from a bias power source (not shown) to the transferring unit 6. In addition, when the transfer material 7 is paper, the transfer material 7 is taken out of a sheet feeding portion (not shown) and supplied to a space between the electrophotographic photosensitive member 1 and the transferring unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1, is conveyed to a fixing unit 8, and is subjected to a treatment for fixing the toner image to be printed out as an image-formed product (a print or a copy) to the outside of the electrophotographic apparatus.

The electrophotographic apparatus may include a cleaning unit 9 for removing a deposit, such as the toner remaining on the surface of the electrophotographic photosensitive member 1 after the transfer. In addition, a so-called cleanerless system configured to remove the deposit with the developing unit or the like without separate arrangement of the cleaning unit 9 may be used.

In the present invention, a plurality of components selected from the electrophotographic photosensitive member 1, the charging unit 3, the developing unit 5, the cleaning unit 9, and the like may be stored in a container and integrally supported to form a process cartridge 11. In addition, the process cartridge 11 is detachably attachable to the main body of the electrophotographic apparatus.

Specifically, for example, such a configuration as described below may be adopted. At least one selected from the charging unit 3, the developing unit 5, and the cleaning unit 9 is integrally supported with the electrophotographic photosensitive member 1 to form a cartridge. The cartridge may be used as the process cartridge 11 to be detachably attachable to the main body of the electrophotographic apparatus with a guiding unit 12 such as a rail of the main body of the electrophotographic apparatus.

The electrophotographic apparatus according to the present invention may include an electricity-removing mechanism for subjecting the surface of the electrophotographic photosensitive member 1 to electricity-removing treatment with pre-exposure light 10 from a pre-exposing unit (not shown). In addition, the guiding unit 12 such as the rail may be arranged in the electrophotographic apparatus for removably mounting the process cartridge 11 according to the present invention onto the main body of the electrophotographic apparatus. The electrophotographic apparatus according to the present invention is characterized by including the electrophotographic photosensitive member 1, the charging unit 3, the exposing unit, the developing unit 5, and the transferring unit 6.

The electrophotographic photosensitive member of the present invention can be used in, for example, a laser beam printer, an LED printer, a copying machine, a facsimile, and a multifunctional peripheral thereof.

According to the present invention, the electrophotographic photosensitive member excellent in suppression of an increase in residual potential, the process cartridge including such electrophotographic photosensitive member, and the electrophotographic apparatus including such electrophotographic photosensitive member can be provided.

EXAMPLES

The present invention is described in more detail below by way of Examples and Comparative Examples. The present invention is by no means limited to the following Examples, and various modifications may be made without departing from the gist of the present invention. In the description in the following Examples, the term "part(s)" is by mass unless otherwise specified.

<Production of Electroconductive Particles>

(Production of Niobium-containing Titanium Oxide Particles (T1-1))

Anatase-type titanium dioxide of an approximately spherical shape having an average primary particle diameter of 150 nm and a niobium content of 0.20 mass % was used as a core. 100 g of the core was dispersed in water to give 1 L of an aqueous suspension, which was heated to 60° C. In addition, a titanium-niobium acid solution was prepared by mixing a niobium solution, which was obtained by dissolving 3 g of niobium pentachloride ($NbCl_5$) in 100 mL of 11.4 mol/L hydrochloric acid, with 600 mL of a titanium sulfate solution having a content of 33.7 g in terms of Ti. The titanium-niobium acid solution and a 10.7 mol/L sodium hydroxide solution were simultaneously added dropwise (parallel addition) over 3 hours so that the aqueous suspension had a pH of from 2 to 3. After the completion of the dropwise addition, the aqueous suspension was filtered, washed, and dried at 110° C. for 8 hours. The dried product was subjected to heating treatment in an air atmosphere at 800° C. for 1 hour to provide powder of niobium-containing titanium oxide particles (T1-1) each having the core and a coating layer that contained niobium-containing titanium oxide.

(Production of Niobium-containing Titanium Oxide Particles (T1-2) to (T1-6))

Powders of niobium-containing titanium oxide particles (T1-2) to (T1-6) having particle diameters shown in Table 6 were obtained in the same manner as in the production of the niobium-containing titanium oxide particles (T1-1) except that the average primary particle diameter of the core to be used and the conditions at the time of coating were changed. Niobium contents in Table 6 are niobium contents in the niobium-containing titanium oxide particles, and represent values obtained through measurement by an elemental analysis method with X-ray fluorescence (XRF).

(Production of Niobium-containing Titanium Oxide Particles (T2-1))

Niobium sulfate (water-soluble niobium compound) was added to an aqueous solution of titanyl sulfate at 1.0 mass % in terms of niobium ions with respect to the amount of titanium (in terms of titanium dioxide). Fine particle nuclei formed of titanium hydroxide were added to the aqueous solution of titanyl sulfate, and the mixture was heated and boiled to be hydrolyzed, to thereby provide a hydrous titanium dioxide slurry.

The hydrous titanium dioxide slurry containing niobium ions obtained above was filtered, washed, and dried at 110° C. for 8 hours. The dried product was subjected to heating treatment in an air atmosphere at 800° C. for 1 hour to provide powder of niobium-containing titanium oxide particles (T2-1). The niobium content in the resultant niobium-containing titanium oxide particles (T2-1) is shown in Table 6.

TABLE 6

| Niobium-containing titanium oxide | Average particle diameter (nm) | Niobium content (mass %) |
|---|---|---|
| T1-1 | 170 | 5.0 |
| T1-2 | 220 | 7.2 |
| T1-3 | 160 | 2.2 |
| T1-4 | 260 | 5.1 |
| T1-5 | 300 | 8.0 |
| T1-6 | 160 | 2.6 |
| T2-1 | 180 | 5.0 |

<Production of Electrophotographic Photosensitive Member>

Example 1

An aluminum cylinder having a diameter of 24 mm and a length of 257.5 mm (JIS-A3003, aluminum alloy) was used as a support (electroconductive support).

Next, the following materials were prepared.

| | |
|---|---|
| Titanium oxide ($TiO_2$) particles (average primary particle diameter: 230 nm) coated with oxygen-deficient tin oxide ($SnO_2$), serving as metal oxide particles | 214 parts |
| Phenol resin (monomer/oligomer of a phenol resin) (product name: PLYOPHEN J-325, manufactured by DIC Corporation, resin solid content: 60 mass %) serving as a binding material | 132 parts |
| 1-Methoxy-2-propanol serving as a solvent | 98 parts |

Those materials were placed in a sand mill using 450 parts of glass beads each having a diameter of 0.8 mm, and were subjected to dispersion treatment under the conditions of a rotation speed of 2,000 rpm, a dispersion treatment time of 4.5 hours, and a preset temperature of cooling water of 18° C. to provide a dispersion liquid. The glass beads were removed from the dispersion liquid with a mesh (aperture: 150 μm). To the resultant dispersion liquid, silicone resin particles (product name: TOSPEARL 120, manufactured by Momentive Performance Materials, average particle diameter: 2 μm) serving as a surface roughness-imparting material were added. The addition amount of the silicone resin particles was set to 10 mass % with respect to the total mass of the metal oxide particles and the binding material in the dispersion liquid after the removal of the glass beads. In addition, a silicone oil (product name: SH28PA, manufactured by Dow Toray Co., Ltd.) serving as a leveling agent was added to the dispersion liquid at 0.01 mass % with respect to the total mass of the metal oxide particles and the binding material in the dispersion liquid.

Next, a mixed solvent of methanol and 1-methoxy-2-propanol (mass ratio 1:1) was added to the dispersion liquid so that the total mass of the metal oxide particles, the binding material, and the surface roughness-imparting material (i.e., the mass of the solid content) in the dispersion liquid became 67 mass % with respect to the mass of the dispersion liquid. After that, the mixture was stirred to prepare a coating liquid for an electroconductive layer. The coating liquid for an electroconductive layer was applied onto the support by dip coating, and the resultant was heated at 140° C. for 1 hour to form an electroconductive layer having a thickness of 30 μm.

Next, the following materials were prepared.

| | |
|---|---|
| Electron-transporting substance (formula E-1) | 3.11 parts |
| Blocked isocyanate (product name: DURANATE SBB-70P, manufactured by Asahi Kasei Chemicals Corporation) | 6.49 parts |
| Styrene-acrylic resin (product name: UC-3920, manufactured by Toagosei Co., Ltd.) | 0.4 part |
| Silica slurry (product name: IPA-ST-UP, manufactured by Nissan Chemical Industries, Ltd., solid content concentration: 15 mass %, viscosity: 9 mPa · s) | 1.8 parts |

Those materials were dissolved in a mixed solvent of 48 parts of 1-butanol and 24 parts of acetone to prepare a coating liquid for an undercoat layer. The coating liquid for an undercoat layer was applied onto the electroconductive layer by dip coating, and the resultant was heated at 170° C. for 30 minutes to form an undercoat layer having a thickness of 0.7 μm.

(E-1)

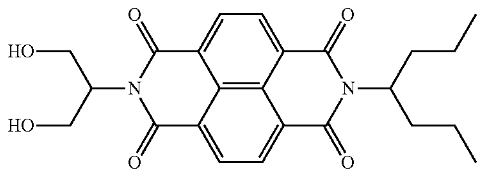

Next, 10 parts of hydroxygallium phthalocyanine of a crystal form having peaks at positions of 7.5° and 28.4° in a chart obtained by CuKα characteristic X-ray diffraction and 5 parts of a polyvinyl butyral resin (product name: S-LEC BX-1, manufactured by Sekisui Chemical Co., Ltd.) were prepared. Those materials were added to 200 parts of cyclohexanone, and the mixture was dispersed with a sand mill apparatus using glass beads each having a diameter of 0.9 mm for 6 hours. The resultant was diluted by further adding 150 parts of cyclohexanone and 350 parts of ethyl acetate thereto to provide a coating liquid for a charge-generating layer. The resultant coating liquid was applied onto the undercoat layer by dip coating, followed by drying at 95° C. for 10 minutes to form a charge-generating layer having a thickness of 0.20 μm.

X-ray diffraction measurement was performed under the following conditions.

[Powder X-ray Diffraction Measurement]

Measurement apparatus used: X-ray diffraction apparatus RINT-TTRII, manufactured by Rigaku Corporation X-ray tube bulb: Cu Tube voltage: 50 KV Tube current: 300 mA Scan method: 2θ/θ scan Scan speed: 4.0°/min Sampling interval: 0.02°

Start angle (2θ): 5.0°

Stop angle (2θ): 40.0°

Attachment: standard sample holder

Filter: not used

Incident monochrometer: used

Counter monochrometer: not used

Divergent slit: open

Divergent longitudinal restriction slit: 10.00 mm

Scattering slit: open

Light-receiving slit: open
Flat sheet monochrometer: used
Counter: scintillation counter Next, the following materials were prepared.

| | |
|---|---|
| Charge-transporting substance (hole-transportable substance) represented by the following structural formula (C-1) | 6 parts |
| Charge-transporting substance (hole-transportable substance) represented by the following structural formula (C-2) | 3 parts |
| Charge-transporting substance (hole-transportable substance) represented by the following structural formula (C-3) | 1 part |
| Polycarbonate resin (product name: Iupilon Z400, manufactured by Mitsubishi Engineering-Plastics Corporation) | 10 parts |
| Polycarbonate resin having a copolymerization unit of the following structural formula (C-4) and the following structural formula (C-5) (x/y = 0.95/0.05: viscosity-average molecular weight = 20,000) | 0.02 part |

Those materials were dissolved in a mixed solvent of 25 parts of o-xylene/25 parts of methyl benzoate/25 parts of dimethoxymethane to prepare a coating liquid for a charge-transporting layer. The coating liquid for a charge-transporting layer was applied onto the charge-generating layer by dip coating to form a coat, and the coat was dried at 120° C. for 30 minutes to form a charge-transporting layer having a thickness of 12 μm.

(C-1)

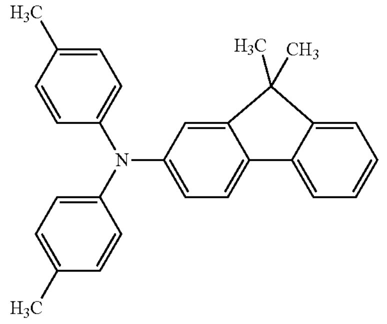

(C-2)

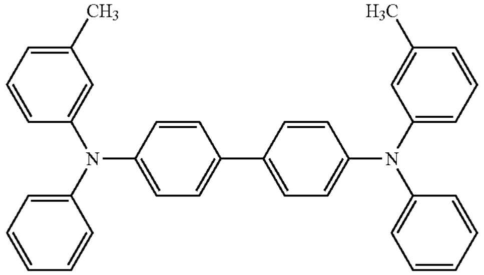

(C-3)

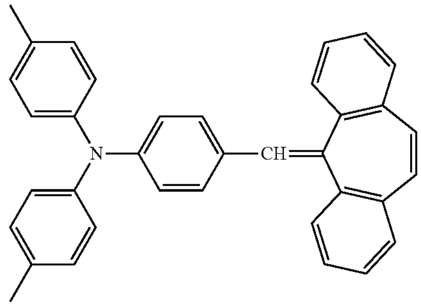

-continued (C-4)

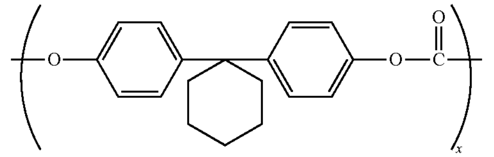

(C-5)

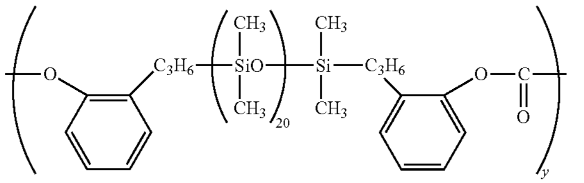

Next, the following materials were prepared.

| | |
|---|---|
| (A1) shown in Table 1 serving as an organic salt | 0.24 part |
| Compound represented by the following structural formula (OC-1) serving as a charge-transporting monomer | 12 parts |
| Compound represented by the following structural formula (OB-1) serving as a binder component | 12 parts |
| Siloxane-modified acrylic compound (Symac US270, manufactured by Toagosei Co., Ltd.) | 0.1 part |

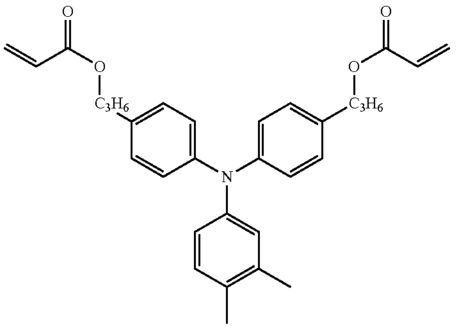

(OC-1)

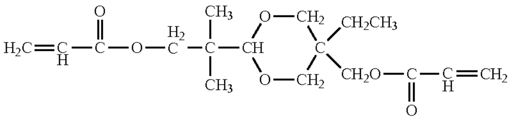

(OB-1)

Those materials were mixed with 60 parts of tetrahydrofuran, and the mixture was stirred. Thus, a coating liquid for a protective layer was prepared.

The coating liquid for a protective layer was applied onto the charge-transporting layer by dip coating to form a coat, and the resultant coat was dried at 50° C. for 6 minutes. After that, under a nitrogen atmosphere, the coat was irradiated with an electron beam for 2.8 seconds under the conditions of an acceleration voltage of 50 kV and a beam current of 5.0 mA while the support (body to be irradiated) was rotated at a speed of 200 rpm with a distance between the support (body to be irradiated) and an electron beam irradiation window set to 20 mm. The absorbed dose of the electron beam in this case was measured and found to be 15 kGy. After that, under a nitrogen atmosphere, heating of the coat was performed by increasing its temperature from 25° C. to 117° C. over 20 seconds. An oxygen concentration during a period from the electron beam irradiation to the subsequent heating treatment was 10 ppm or less. Next, in the air, the coat was naturally cooled until its temperature became 25° C., and heating treatment was performed for 30 minutes under such a condition that the temperature of the coat became 105° C., to thereby form a surface layer having a thickness of 3 μm. Thus, an electrophotographic photosensitive member of a cylindrical shape (drum shape) according to Example 1 was produced.

Examples 2 to 17

In Example 1, the kind and amount of each of the organic salt, the charge-transportable monomer, and the binder component to be used were changed as shown in Table 7. Electrophotographic photosensitive members were produced in the same manner as in Example 1 except for the foregoing.

Charge-transportable monomers and binder components shown in Table 7 are as described below.

Charge-transportable monomer OC-2: A compound represented by the following structural formula (OC-2)

(OC-2)

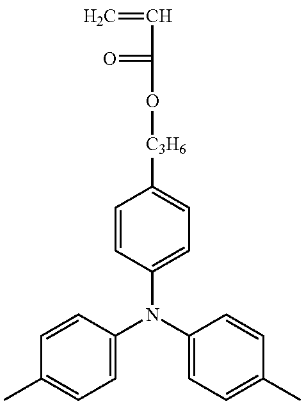

Charge-transportable monomer OC-3: A compound represented by the following structural formula (OC-3)

(OC-3)

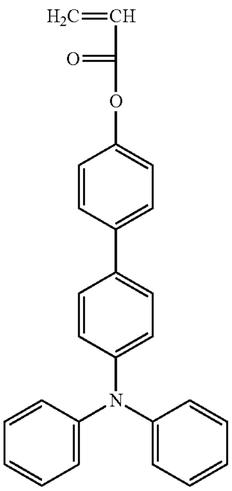

Binder component OB-2: A compound represented by the following structural formula (OB-2)

(OB-2)

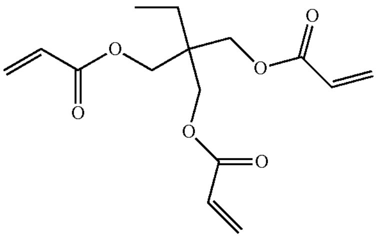

Binder component OB-3: A compound represented by the following structural formula (OB-3)

(OB-3)

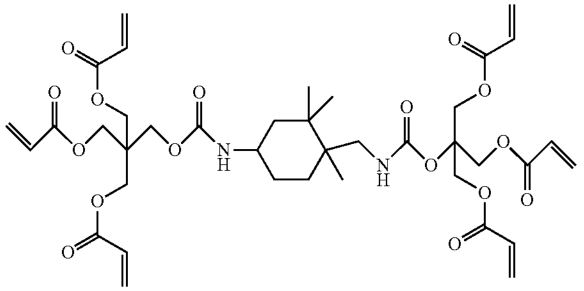

Example 18

In Example 1, the method of preparing the coating liquid for a protective layer was changed as described below. First, the organic salt (A1) was changed to the organic salt (A7), and the compound represented by the structural formula (OC-1) was changed to a compound represented by the following structural formula (OC-4). In addition, 11 parts of an isocyanate compound (product name: DURANATE SBN-70D, manufactured by Asahi Kasei Chemicals Corporation) and 1 part of an acetal resin (product name: KS-5Z, manufactured by Sekisui Chemical Co., Ltd.) were used in place of 12 parts of the compound represented by the structural formula (OB-1).

The resultant coating liquid for a protective layer was applied onto the charge-transporting layer by dip coating to form a coat, and the resultant coat was heated at 170° C. for 30 minutes to be cured (polymerized), to thereby form a surface layer having a thickness of 3 μm. An electrophotographic photosensitive member was produced in the same manner as in Example 1 except for the foregoing.

(OC-4)

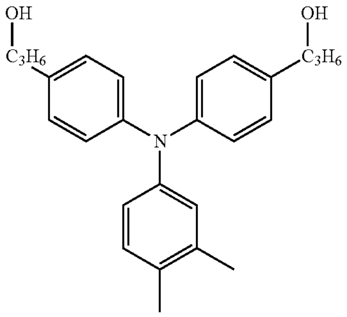

Example 19

In Example 1, the organic salt (A1) was changed to the organic salt (A9), and the compound represented by the structural formula (OC-1) was changed to the compound represented by the structural formula (OC-4). In addition, the coating liquid for a protective layer was prepared using 11 parts of a guanamine compound represented by the following structural formula (OB-4) and 1 part of a butyral resin (product name: BL-1, manufactured by Sekisui Chemical Co., Ltd.) in place of 12 parts of the compound represented by the structural formula (OB-1). Further, 0.1 part of 3,5-di-t-butyl hydroxytoluene serving as an antioxidant and 0.015 part of dodecylbenzenesulfonic acid were added to the coating liquid for a protective layer.

The resultant coating liquid for a protective layer was applied onto the charge-transporting layer by dip coating to form a coat, and the resultant coat was heated at 170° C. for 30 minutes to be cured (polymerized), to thereby form a surface layer having a thickness of 3 μm. An electrophotographic photosensitive member was produced in the same manner as in Example 1 except for the foregoing.

(OB-4)

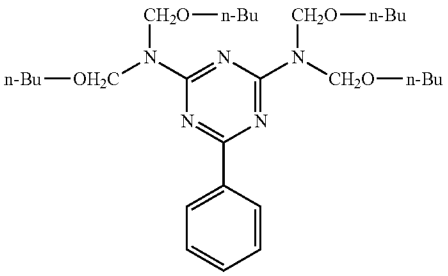

Example 20

An electrophotographic photosensitive member was produced in the same manner as in Example 1 except that the surface layer was formed as described below.

The following materials were prepared.

| | |
|---|---|
| Niobium-containing titanium oxide particles (T1-1) (specific gravity: 4 g/$cm^3$) | 100 parts |
| Compound represented by the following formula (S-1) serving as a silane coupling agent (product name: KBM-3033, manufactured by Shin-Etsu Chemical Co., Ltd.) | 3 parts |

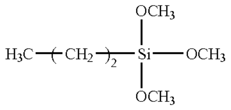

(S-1)

Those materials were mixed with 200 parts of toluene, and the mixture was stirred with a stirring device for 4 hours. After that, the resultant was filtered, washed, and then further subjected to heating treatment at 130° C. for 3 hours. Thus, the niobium-containing titanium oxide particles (T1-1) were subjected to surface treatment.

Next, the following materials were prepared.

| | |
|---|---|
| Organic salt (A1) | 0.01 part |
| Compound represented by the structural formula (OB-1) serving as a binder component | 1 part |
| The surface-treated niobium-containing titanium oxide particles serving as electroconductive particles | 1 part |

Those materials were mixed with a mixed solvent of 5 parts of 1-propanol/5 parts of cyclohexane, and the mixture was stirred with a stirring device for 6 hours. Thus, a coating liquid for a protective layer was prepared.

The coating liquid for a protective layer was applied onto the charge-transporting layer by dip coating to form a coat, and the resultant coat was dried at 50° C. for 6 minutes. After that, under a nitrogen atmosphere, the coat was irradiated with an electron beam for 1.6 seconds under the conditions of an acceleration voltage of 70 kV and a beam current of 5.0 mA while the support (body to be irradiated) was rotated at a speed of 300 rpm. A dose at the position of the protective layer was 15 kGy. After that, under a nitrogen atmosphere, the temperature of the coat was increased to 117° C. An oxygen concentration during a period from the electron beam irradiation to the subsequent heating treatment was 10 ppm. Next, in the air, the coat was naturally cooled until its temperature became 25° C., and then heating treatment was performed for 1 hour under such a condition that the temperature of the coat became 120° C., to thereby form a surface layer having a thickness of 3 μm.

Examples 21 to 34

Electrophotographic photosensitive members were produced in the same manner as in Example 20 except that, in Example 20, the kind and amount of the electroconductive particles to be used were changed as shown in Table 8.

Example 35

In Example 20, the method of preparing the coating liquid for a protective layer was changed as described below. First, the organic salt (A1) was changed to the organic salt (A7). In addition, 0.5 part of an isocyanate compound (product name: DURANATE SBN-70D, manufactured by Asahi Kasei Chemicals Corporation) and 0.5 part of an acetal resin (product name: KS-5Z, manufactured by Sekisui Chemical Co., Ltd.) were used in place of 1 part of the compound represented by the structural formula (OB-1).

The resultant coating liquid for a protective layer was applied onto the charge-transporting layer by dip coating to form a coat, and the resultant coat was heated at 170° C. for 30 minutes to be cured (polymerized), to thereby form a surface layer having a thickness of 3 μm. An electrophotographic photosensitive member was produced in the same manner as in Example 20 except for the foregoing.

Example 36

In Example 20, the organic salt (A1) was changed to the organic salt (A7). In addition, the coating liquid for a protective layer was prepared using 0.5 part of a guanamine compound represented by the structural formula (OB-4) and 0.5 part of a butyral resin (product name: BL-1, manufactured by Sekisui Chemical Co., Ltd.) in place of 1 part of the compound represented by the structural formula (OB-1). Further, 0.01 part of 3,5-di-t-butyl-4-hydroxytoluene serving as an antioxidant and 0.001 part of dodecylbenzenesulfonic acid were added to the coating liquid for a protective layer.

The coating liquid for a protective layer was applied onto the charge-transporting layer by dip coating to form a coat, and the resultant coat was heated at 170° C. for 30 minutes to be cured (polymerized), to thereby form a surface layer having a thickness of 3 μm. An electrophotographic photosensitive member was produced in the same manner as in Example 20 except for the foregoing.

Example 37

An electrophotographic photosensitive member was produced in the same manner as in Example 20 except that the surface layer was formed as described below.

The following materials were prepared.

| | |
|---|---|
| Tin oxide particles (product name: S-2000, manufactured by Mitsubishi Materials Corporation) | 100 parts |
| Compound represented by the formula (S-1) serving as a silane coupling agent | 20 parts |

Those materials were mixed with 200 parts of toluene, and the mixture was stirred with a stirring device for 4 hours. After that, the resultant was filtered, washed, and then further subjected to heating treatment at 130° C. for 3 hours. Thus, the tin oxide particles were subjected to surface treatment.

In Example 20, the kind of the electroconductive particles to be used was changed from the surface-treated niobium-containing titanium oxide particles to the surface-treated tin oxide obtained above. An electrophotographic photosensitive member was produced in the same manner as in Example 20 except for the foregoing.

Example 38

An electrophotographic photosensitive member was produced in the same manner as in Example 1 except that the surface layer was formed as described below.

The following materials were prepared.

| | |
|---|---|
| Organic salt (A1) | 0.24 part |
| Compound represented by the following structural formula (OC-1) serving as a charge-transporting monomer | 6 parts |
| Compound represented by the structural formula (OB-1) serving as a binder component | 6 parts |
| Surface-treated niobium-containing titanium oxide particles (T1-1) serving as electroconductive particles | 12 parts |

Those materials were mixed with a mixed solvent of 5 parts of 1-propanol/5 parts of cyclohexane, and the mixture was stirred with a stirring device for 6 hours. Thus, a coating liquid for a protective layer was prepared.

The coating liquid for a protective layer was applied onto the charge-transporting layer by dip coating to form a coat, and the resultant coat was dried at 50° C. for 6 minutes. After that, under a nitrogen atmosphere, the coat was irradiated with an electron beam for 1.6 seconds under the conditions of an acceleration voltage of 70 kV and a beam current of 5.0 mA while the support (body to be irradiated) was rotated at a speed of 300 rpm. A dose at the position of the protective layer was 15 kGy. After that, under a nitrogen atmosphere, the temperature of the coat was increased to 117° C. An oxygen concentration during a period from the electron beam irradiation to the subsequent heating treatment was 10 ppm. Next, in the air, the coat was naturally cooled until its temperature became 25° C., and then heating treatment was performed for 1 hour under such a condition that the temperature of the coat became 120° C., to thereby form a surface layer having a thickness of 3 μm.

Examples 39 and 40

Electrophotographic photosensitive members were produced in the same manner as in Example 38 except that, in Example 38, the amounts of the materials to be used were changed as shown in Table 9.

Comparative Examples 1 to 5

In Example 1, no organic salt was used, and the kind and amount of each of the charge-transportable monomer and the binder component to be used were changed as shown in Table 10. Electrophotographic photosensitive members were produced in the same manner as in Example 1 except for the foregoing.

Comparative Examples 6 to 9

In Example 20, no organic salt was used, and the kind and amount of the binder component to be used were changed as shown in Table 11. Electrophotographic photosensitive members were produced in the same manner as in Example 20 except for the foregoing.

[Residual Potential Evaluation]

The electrophotographic photosensitive member produced in each of Examples and Comparative Examples described above was mounted onto an apparatus obtained by reconstructing a laser beam printer (product name: LBP-2510, manufactured by Canon Inc.). Next, process conditions were set as described below, and residual potential evaluation was performed. The laser beam printer was reconstructed as follows: a process speed was changed to 300 mm/s, a dark portion potential became −700 V, and the light amount of exposure light (image exposure light) became variable. Specifically, the evaluation was performed as described below.

Under an environment having a temperature of 23° C. and a humidity of 50% RH, measurement was performed by removing a cartridge for development from the evaluation machine and inserting a potential measurement apparatus thereinto. The potential measurement apparatus was configured by placing a potential measurement probe at the development position of the cartridge for development, and the position of the potential measurement probe with respect to the electrophotographic photosensitive member was set to the center in a drum axis direction.

A residual potential was evaluated by being determined based on a potential at the time of irradiation with the same light amount. As the potential becomes lower, an effect of suppressing an increase in residual potential can be evaluated as being high.

First, the light amount was set to 1.8 μJ/cm$^2$, and an initial residual potential was measured. Next, under such a condition that an initial light portion potential became −150 V, image output was performed on 10,000 sheets, and then the residual potential was measured. After that, image output was further performed on 10,000 sheets (20,000 sheets in total), and then the residual potential was measured again. Evaluation results are shown in Tables 7 to 11. All measured values of residual potentials are negative values, but the values of residual potentials shown in Tables 7 to 11 are the absolute values of the measured values.

TABLE 7

| | Organic salt | | Charge-transportable compound | | Binder component | | Charge-transportable compound/ | Residual potential (V) | | |
|---|---|---|---|---|---|---|---|---|---|---|
| Example | Kind | Amount (part(s)) | Kind | Amount (part(s)) | Kind | Amount (part(s)) | Organic salt (mass ratio) | Initial | 10,000 sheets | 20,000 sheets |
| 1 | A1 | 0.24 | OC-1 | 12 | OB-1 | 12 | 50 | 4 | 5 | 9 |
| 2 | A2 | 0.24 | OC-2 | 12 | OB-1 | 12 | 50 | 5 | 5 | 10 |
| 3 | A2 | 0.24 | OC-2 | 24 | — | 0 | 100 | 4 | 6 | 12 |
| 4 | B1 | 0.12 | OC-1 | 12 | OB-1 | 12 | 100 | 4 | 5 | 8 |
| 5 | B3 | 0.12 | OC-1 | 12 | OB-1 | 12 | 100 | 5 | 7 | 10 |
| 6 | C1 | 0.24 | OC-1 | 24 | — | 0 | 100 | 4 | 5 | 9 |
| 7 | C3 | 0.12 | OC-1 | 24 | — | 0 | 200 | 4 | 6 | 11 |
| 8 | D2 | 0.09 | OC-1 | 18 | OB-1 | 6 | 200 | 7 | 7 | 12 |
| 9 | D4 | 0.09 | OC-1 | 18 | OB-1 | 6 | 200 | 4 | 6 | 10 |
| 10 | E1 | 0.12 | OC-2 | 12 | OB-1 | 12 | 100 | 6 | 7 | 10 |
| 11 | E2 | 0.12 | OC-2 | 12 | OB-1 | 12 | 100 | 4 | 5 | 8 |
| 12 | A4 | 1.2 | OC-1 | 12 | OB-1 | 12 | 10 | 5 | 6 | 10 |
| 13 | A4 | 0.012 | OC-1 | 12 | OB-1 | 12 | 1,000 | 5 | 7 | 12 |
| 14 | A4 | 12 | OC-1 | 12 | OB-1 | 12 | 1 | 6 | 12 | 18 |
| 15 | A4 | 0.0012 | OC-1 | 12 | OB-1 | 12 | 10,000 | 7 | 11 | 19 |
| 16 | A3 | 0.24 | OC-3 | 12 | OB-2 | 12 | 50 | 4 | 6 | 9 |
| 17 | A6 | 0.24 | OC-2 | 12 | OB-3 | 12 | 50 | 5 | 7 | 10 |
| 18 | A7 | 0.24 | OC-4 | 12 | Isocyanate compound | 11 | 50 | 7 | 8 | 14 |
| | | | | | Acetal resin | 1 | | | | |
| 19 | A9 | 0.24 | OC-4 | 12 | Guanamine compound | 11 | 50 | 6 | 9 | 15 |
| | | | | | Butyral resin | 1 | | | | |

TABLE 8

| | Organic salt | | Electroconductive particles | | Binder component | | Electroconductive | Residual potential (V) | | |
|---|---|---|---|---|---|---|---|---|---|---|
| Example | Kind | Amount (part(s)) | Kind | Amount (part(s)) | Kind | Amount (part(s)) | particles/Organic salt (mass ratio) | Initial | 10,000 sheets | 20,000 sheets |
| 20 | A1 | 0.01 | T1-1 | 1 | OB-1 | 1 | 100 | 4 | 5 | 8 |
| 21 | A2 | 0.01 | T1-1 | 1 | OB-1 | 1 | 100 | 4 | 6 | 9 |
| 22 | A2 | 0.01 | T2-1 | 1 | OB-1 | 1 | 100 | 6 | 9 | 14 |
| 23 | B1 | 0.01 | T1-5 | 2 | OB-1 | 1 | 200 | 5 | 7 | 8 |
| 24 | B3 | 0.01 | T1-5 | 2 | OB-1 | 1 | 200 | 4 | 6 | 9 |
| 25 | C1 | 0.02 | T1-2 | 4 | OB-1 | 1 | 200 | 4 | 5 | 8 |
| 26 | C3 | 0.02 | T1-3 | 4 | OB-1 | 1 | 200 | 6 | 7 | 10 |
| 27 | D2 | 0.01 | T1-2 | 4 | OB-1 | 1 | 400 | 5 | 5 | 9 |
| 28 | D4 | 0.01 | T1-2 | 4 | OB-1 | 1 | 400 | 6 | 6 | 8 |
| 29 | E1 | 0.02 | T1-6 | 2 | OB-1 | 1 | 100 | 6 | 6 | 8 |
| 30 | E2 | 0.02 | T1-6 | 2 | OB-1 | 1 | 100 | 4 | 5 | 10 |
| 31 | A4 | 0.2 | T1-1 | 2 | OB-1 | 1 | 10 | 6 | 7 | 10 |
| 32 | A4 | 0.002 | T1-1 | 2 | OB-1 | 1 | 1,000 | 5 | 7 | 12 |
| 33 | A4 | 2 | T1-1 | 2 | OB-1 | 1 | 1 | 7 | 10 | 19 |
| 34 | A4 | 0.0002 | T1-1 | 2 | OB-1 | 1 | 10,000 | 6 | 11 | 18 |
| 35 | A7 | 0.01 | T1-1 | 1 | Isocyanate compound | 0.5 | 100 | 5 | 12 | 17 |
| | | | | | Acetal resin | 0.5 | | | | |
| 36 | A9 | 0.01 | T1-1 | 1 | Guanamine compound | 0.5 | 100 | 4 | 13 | 18 |
| | | | | | Butyral resin | 0.5 | | | | |
| 37 | A2 | 0.02 | Tin oxide | 1 | OB-1 | 1 | 50 | 6 | 11 | 19 |

TABLE 9

| | Organic salt | | Charge-transportable compound | | electroconductive particles | | Binder component | | Charge-transportable compound/ | Electroconductive | Residual potential (V) | | |
|---|---|---|---|---|---|---|---|---|---|---|---|---|---|
| Example | Kind | Amount (part(s)) | Kind | Amount (part(s)) | Kind | Amount (part(s)) | Kind | Amount (part(s)) | Organic salt (mass ratio) | particles/Organic salt (mass ratio) | Initial | 10,000 sheets | 20,000 sheets |
| 38 | A1 | 0.24 | OC-1 | 6 | T1-1 | 12 | OB-1 | 6 | 25 | 50 | 4 | 7 | 11 |
| 39 | A1 | 0.12 | OC-1 | 6 | T1-1 | 24 | OB-1 | 6 | 50 | 200 | 5 | 7 | 10 |
| 40 | A1 | 0.12 | OC-1 | 12 | T1-1 | 24 | — | 0 | 100 | 200 | 5 | 5 | 9 |

TABLE 10

| | Organic salt | | Charge-transportable compound | | Binder component | | Charge-transportable compound/ | Residual potential (V) | | |
|---|---|---|---|---|---|---|---|---|---|---|
| Comparative Example | Kind | Amount (part(s)) | Kind | Amount (part(s)) | Kind | Amount (part(s)) | Organic salt (mass ratio) | Initial | 10,000 sheets | 20,000 sheets |
| 1 | — | 0 | OC-1 | 12 | OB-1 | 12 | — | 10 | 17 | 20 |
| 2 | — | 0 | OC-3 | 12 | OB-2 | 12 | — | 9 | 16 | 22 |
| 3 | — | 0 | OC-2 | 12 | OB-3 | 12 | — | 13 | 19 | 23 |
| 4 | — | 0 | OC-4 | 12 | Isocyanate compound | 11 | — | 12 | 18 | 27 |
| | | | | | Acetal resin | 1 | | | | |
| 5 | — | 0 | OC-4 | 12 | Guanamine compound | 11 | — | 11 | 19 | 29 |
| | | | | | Butyral resin | 1 | | | | |

TABLE 11

| | Organic salt | | Electroconductive particles | | Binder component | | Electroconductive | Residual potential (V) | | |
|---|---|---|---|---|---|---|---|---|---|---|
| Comparative Example | Kind | Amount (part(s)) | Kind | Amount (part(s)) | Kind | Amount (part(s)) | particles/Organic salt (mass ratio) | Initial | 10,000 sheets | 20,000 sheets |
| 6 | — | 0 | T1-1 | 1 | OB-1 | 1 | — | 9 | 18 | 21 |
| 7 | — | 0 | T1-1 | 1 | OB-2 | 1 | — | 11 | 17 | 20 |
| 8 | — | 0 | T1-1 | 1 | Isocyanate compound | 0.5 | — | 12 | 19 | 26 |
| | | | | | Acetal resin | 0.5 | | | | |
| 9 | — | 0 | T1-1 | 1 | Guanamine compound | 0.5 | — | 13 | 18 | 27 |
| | | | | | Butyral resin | 0.5 | | | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-150504, filed Sep. 15, 2021, which is hereby incorporated by reference herein in its entirety.

What is claimed is:

1. An electrophotographic photosensitive member, comprising:

a support; and a surface layer, the surface layer comprises a cured product of a composition containing an organic salt having a polymerizable functional group and at least one member selected from the group consisting of a charge-transportable compound and an electroconductive particle, wherein the organic salt is at least one compound selected from the group consisting of formulae (A)-(E)

(A)

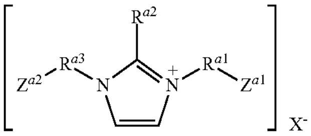

(B)

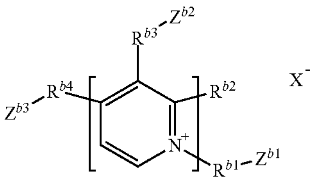

(C)
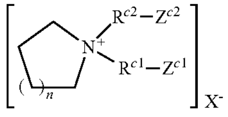

(D)
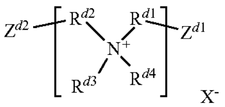

(E)
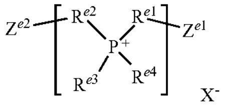

where $R^{a1}$ and $R^{a3}$ independently represent a single bond or an alkylene group having 8 or less carbon atoms that may have a hydroxy group as a substituent, $R^{a2}$ represents a hydrogen atom, a methyl group or an ethyl group, $Z^{a1}$ and $Z^{a2}$ independently represent a hydrogen atom, an acryloyloxy group, a methacryloyloxy group, a vinyl group, a hydroxy group, a carboxy group, a thiol group or an amino group, provided that at least one of $Z^{a1}$ or $Z^{a2}$ represents an acryloyloxy group, a methacryloyloxy group or a vinyl group, $R^{b1}$, $R^{b3}$ and $R^{b4}$ independently represent a single bond or an alkylene group having 8 or less carbon atoms that may have a hydroxy group as a substituent, $R^{b2}$ represents a hydrogen atom, a methyl group or an ethyl group, $Z^{b1}$, $Z^{b2}$ and $Z^{b3}$ independently represent a hydrogen atom, an acryloyloxy group, a methacryloyloxy group, a vinyl group, a hydroxy group, a carboxy group, a thiol group or an amino group, provided that at least one of $Z^{b1}$, $Z^{b2}$ or $Z^{b3}$ represents an acryloyloxy group, a methacryloyloxy group or a vinyl group, $R^{c1}$ and $R^{c2}$ independently represent a single bond or an alkylene group having 8 or less carbon atoms that may have a hydroxy group as a substituent, $Z^{c1}$ and $Z^{c2}$ independently represent a hydrogen atom, an acryloyloxy group, a methacryloyloxy group, a vinyl group, a hydroxy group, a carboxy group a thiol group, or an amino group, provided that at least one of $Z^{c1}$ or $Z^{c2}$ represents an acryloyloxy group, a methacryloyloxy group or a vinyl group, n represents 1 or 2, and $R^{d1}$ and $R^{d2}$ independently represent a single bond, or an alkylene group having 8 or less carbon atoms that may have a hydroxy group as a substituent, $R^{d3}$ and $R^{d4}$ independently represent an alkyl group having 8 or less carbon atoms that may have a hydroxy group as a substituent, $Z^{d1}$ and $Z^{d2}$ independently represent a hydrogen atom, an acryloyloxy group, a methacryloyloxy group, a vinyl group, a hydroxy group, a carboxy group, a thiol group or an amino group, provided that at least one of $Z^{d1}$ or $Z^{d2}$ represents an acryloyloxy group, a methacryloyloxy group or a vinyl group, $R^{e1}$ and $R^{e2}$ independently represent a single bond or an alkylene group having 8 or less carbon atoms that may have a hydroxy group as a substituent, $R^{e3}$ and $R^{e4}$ independently represent an alkyl group having 8 or less carbon atoms that may have a hydroxy group as a substituent, $Z^{e1}$ and $Z^{e2}$ independently represent a hydrogen atom, an acryloyloxy group, a methacryloyloxy group, a vinyl group, a hydroxy group, a carboxy group, a thiol group or an amino group, provided that at least one of $Z^{e1}$ or $Z^{e2}$ represents an acryloyloxy group, a methacryloyloxy group or a vinyl group, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$ or $I^-$.

2. The electrophotographic photosensitive member according to claim 1, wherein the organic cation is at least member selected from the group consisting of an imidazolium, a pyridinium, a pyrrolidinium, a piperidinium, a tetraalkylammonium and a tetraalkylphosphonium.

3. The electrophotographic photosensitive member according to claim 1, wherein the composition contains the charge-transportable compound, the charge-transportable compound comprising a charge-transporting monomer having a polymerizable functional group capable of reacting with the organic salt.

4. The electrophotographic photosensitive member according to claim 3, wherein the charge-transporting monomer is represented by formula (1)

(1)
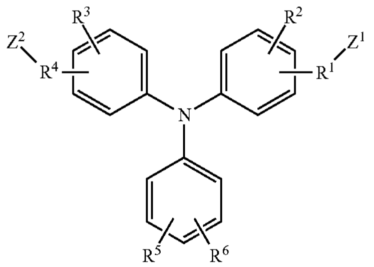

where $R^1$ and $R^4$ independently represent a single bond, an unsubstituted alkylene group having 3 or less carbon atoms or a phenylene group, $R^2$, $R^3$, $R^5$ and $R^6$ independently represent a hydrogen atom, a methyl group, or an ethyl group, and $Z^1$ and $Z^2$ independently represent a hydrogen atom, an acryloyloxy group, a methacryloyloxy group, a vinyl group, a hydroxy group, a carboxy group, a thiol group or an amino group, provided that at least one of $Z^1$ or $Z^2$ represents an acryloyloxy group, a methacryloyloxy group, a vinyl group, a hydroxy group, a carboxy group, a thiol group, or an amino group.

5. The electrophotographic photosensitive member according to claim 4, wherein at least one of $Z^1$ or $Z^2$ represents an acryloyloxy group, a methacryloyloxy group or a vinyl group.

6. The electrophotographic photosensitive member according to claim 1, wherein the composition contains the charge-transportable compound, and a content ratio of the charge-transportable compound with respect to the organic salt in the composition is 10 to 1,000 mass %.

7. The electrophotographic photosensitive member according to claim 1, wherein the composition contains the electroconductive particles, and a content ratio of the electroconductive particles with respect to the organic salt in the composition is 10 to 1,000 mass %.

8. The electrophotographic photosensitive member according to claim 1, wherein the composition contains titanium oxide electroconductive particles.

9. The electrophotographic photosensitive member according to claim 8, wherein the titanium oxide particle contains niobium.

10. The electrophotographic photosensitive member according to claim 1, wherein the composition contains the charge-transportable compound, and the electrophotographic photosensitive member comprises the support, a charge-generating layer, a first charge-transporting layer and a second charge-transporting layer as the surface layer, in this order.

11. The electrophotographic photosensitive member according to claim 1, wherein the composition contains the electroconductive particle, and the electrophotographic photosensitive member comprises the support, a charge-generating layer, a charge-transporting layer and the surface layer, in this order.

12. A process cartridge comprising an electrophotographic photosensitive member and at least one unit selected from the group consisting of a charging unit, a developing unit and a cleaning unit, the process cartridge integrally supporting the electrophotographic photosensitive member and the at least one unit, and being detachably attachable to a main body of an electrophotographic apparatus, the electrophotographic photosensitive member comprising:

a support; and a surface layer, the surface layer comprises a cured product of a composition containing an organic salt having a polymerizable functional group and at least one member selected from the group consisting of a charge-transportable compound and an electroconductive particle, wherein the organic salt is at least one compound selected from the group consisting of formulae (A)-(E)

(A)

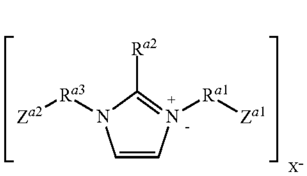

(B)

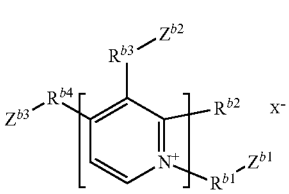

(C)

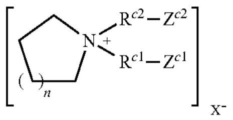

-continued (D)

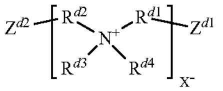

(E)

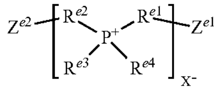

where $R^{a1}$ and $R^{a3}$ independently represent a single bond or an alkylene group having 8 or less carbon atoms that may have a hydroxy group as a substituent, $R^{a2}$ represents a hydrogen atom, a methyl group or an ethyl group, $Z^{a1}$ and $Z^{a2}$ independently represent a hydrogen atom, an acryloyloxy group, a methacryloyloxy group, a vinyl group, a hydroxy group, a carboxy group, a thiol group or an amino group, provided that at least one of $Z^{a1}$ or $Z^{a2}$ represents an acryloyloxy group, a methacryloyloxy group or a vinyl group, $R^{b1}$, $R^{b3}$ and $R^{b4}$ independently represent a single bond or an alkylene group having 8 or less carbon atoms that may have a hydroxy group as a substituent, $R^{b2}$ represents a hydrogen atom, a methyl group or an ethyl group, $Z^{b1}$, $Z^{b2}$ and $Z^{b3}$ independently represent a hydrogen atom, an acryloyloxy group, a methacryloyloxy group, a vinyl group, a hydroxy group, a carboxy group, a thiol group or an amino group, provided that at least one of $Z^{b1}$, $Z^{b2}$ or $Z^{b3}$ represents an acryloyloxy group, a methacryloyloxy group or a vinyl group, $R^{c1}$ and $R^{c2}$ independently represent a single bond or an alkylene group having 8 or less carbon atoms that may have a hydroxy group as a substituent, $Z^{c1}$ and $Z^{c2}$ independently represent a hydrogen atom, an acryloyloxy group, a methacryloyloxy group, a vinyl group, a hydroxy group, a carboxy group a thiol group, or an amino group, provided that at least one of $Z^{c1}$ or $Z^{c2}$ represents an acryloyloxy group, a methacryloyloxy group or a vinyl group, n represents 1 or 2, and $R^{d1}$ and $R^{d2}$ independently represent a single bond, or an alkylene group having 8 or less carbon atoms that may have a hydroxy group as a substituent, $R^{d3}$ and $R^{d4}$ independently represent an alkyl group having 8 or less carbon atoms that may have a hydroxy group as a substituent, $Z^{d1}$ and $Z^{d2}$ independently represent a hydrogen atom, an acryloyloxy group, a methacryloyloxy group, a vinyl group, a hydroxy group, a carboxy group, a thiol group or an amino group, provided that at least one of $Z^{d1}$ or $Z^{d2}$ represents an acryloyloxy group, a methacryloyloxy group or a vinyl group, $R^{e1}$ and $R^{e2}$ independently represent a single bond or an alkylene group having 8 or less carbon atoms that may have a hydroxy group as a substituent, $R^{e3}$ and $R^{e4}$ independently represent an alkyl group having 8 or less carbon atoms that may have a hydroxy group as a substituent, $Z^{e1}$ and $Z^{e2}$ independently represent a hydrogen atom, an acryloyloxy group, a methacryloyloxy group, a vinyl group, a hydroxy group, a carboxy group, a thiol group or an amino group, provided that at least one of $Z^{e1}$ or $Z^{e2}$ represents an acryloyloxy group, a methacryloyloxy group or a vinyl group, and $X^-$ represents $BF_4^-$, $PF_6^-$, $(CF_3SO_2)_2N^-$, $CF_3SO_3^-$, $(FSO_2)\ N^-$, $C_2H_5OSO_3^-$, $(CN)_2N^-$, $SCN^-$, $CH_3COO^-$, $NO_3^-$, $Cl^-$, $Br^-$ or $I^-$.

13. An electrophotographic apparatus comprising an electrophotographic photosensitive member, a charging unit, an exposing unit, a developing unit and a transferring unit, the electrophotographic photosensitive member comprising:

a support; and a surface layer, the surface layer comprises a cured product of a composition containing an organic salt having a polymerizable functional group and at least one member selected from the group consisting of a charge-transportable compound and an electroconductive particle, wherein the organic salt is at least one compound selected from the group consisting of formulae (A)-(E)

(A)

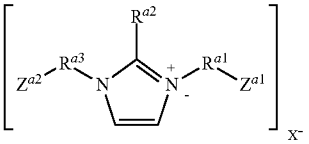

(B)

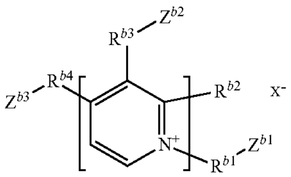

(C)

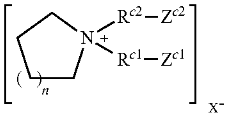

(D)

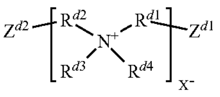

(E)

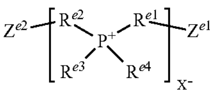

where $R^{a1}$ and $R^{a3}$ independently represent a single bond or an alkylene group having 8 or less carbon atoms that may have a hydroxy group as a substituent, $R^{a2}$ represents a hydrogen atom, a methyl group or an ethyl group, $Z^{a1}$ and $Z^{a2}$ independently represent a hydrogen atom, an acryloyloxy group, a methacryloyloxy group, a vinyl group, a hydroxy group, a carboxy group, a thiol group or an amino group, provided that at least one of $Z^{a1}$ or $Z^{a2}$ represents an acryloyloxy group, a methacryloyloxy group or a vinyl group, $R^{b1}$, $R^{b3}$ and $R^{b4}$ independently represent a single bond or an alkylene group having 8 or less carbon atoms that may have a hydroxy group as a substituent, $R^{b2}$ represents a hydrogen atom, a methyl group or an ethyl group, $Z^{b1}$, $Z^{b2}$ and $Z^{b3}$ independently represent a hydrogen atom, an acryloyloxy group, a methacryloyloxy group, a vinyl group, a hydroxy group, a carboxy group, a thiol group or an amino group, provided that at least one of $Z^{b1}$, $Z^{b2}$ or $Z^{b3}$ represents an acryloyloxy group, a methacryloyloxy group or a vinyl group, $R^{c1}$ and $R^{c2}$ independently represent a single bond or an alkylene group having 8 or less carbon atoms that may have a hydroxy group as a substituent, $Z^{c1}$ and $Z^{c2}$ independently represent a hydrogen atom, an acryloyloxy group, a methacryloyloxy group, a vinyl group, a hydroxy group, a carboxy group a thiol group, or an amino group, provided that at least one of $Z^{c1}$ or $Z^{c2}$ represents an acryloyloxy group, a methacryloyloxy group or a vinyl group, n represents 1 or 2, and $R^{d1}$ and $R^{d2}$ independently represent a single bond, or an alkylene group having 8 or less carbon atoms that may have a hydroxy group as a substituent, $R^{d3}$ and $R^{d4}$ independently represent an alkyl group having 8 or less carbon atoms that may have a hydroxy group as a substituent, $Z^{d1}$ and $Z^{d2}$ independently represent a hydrogen atom, an acryloyloxy group, a methacryloyloxy group, a vinyl group, a hydroxy group, a carboxy group, a thiol group or an amino group, provided that at least one of $Z^{d1}$ or $Z^{d2}$ represents an acryloyloxy group, a methacryloyloxy group or a vinyl group, $R^{e1}$ and $R^{e2}$ independently represent a single bond or an alkylene group having 8 or less carbon atoms that may have a hydroxy group as a substituent, $R^{e3}$ and $R^{e4}$ independently represent an alkyl group having 8 or less carbon atoms that may have a hydroxy group as a substituent, $Z^{e1}$ and $Z^{e2}$ independently represent a hydrogen atom, an acryloyloxy group, a methacryloyloxy group, a vinyl group, a hydroxy group, a carboxy group, a thiol group or an amino group, provided that at least one of $Z^{e1}$ or $Z^{e2}$ represents an acryloyloxy group, a methacryloyloxy group or a vinyl group, and $X^-$ represents $BF_4^-$, $PF_6^-$, $(CF_3SO_2)_2N^-$, $CF_3SO_3^-$, $(FSO_2)N^-$, $C_2H_5OSO_3^-$, $(CN)_2N^-$, $SCN^-$, $CH_3COO^-$, $NO_3^-$, $Cl^-$, $Br^-$ or $I^-$.

* * * * *